(12) United States Patent
Oral et al.

(10) Patent No.: US 7,831,958 B2
(45) Date of Patent: Nov. 9, 2010

(54) SYSTEMS AND METHODS FOR DISTRIBUTING UPDATED INFORMATION

(75) Inventors: Tolga Oral, Arlington, MA (US); Sami Mohammed Shalabi, Winchester, MA (US); Sergei Landar, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 11/191,283

(22) Filed: Jul. 28, 2005

(65) Prior Publication Data

US 2006/0026094 A1 Feb. 2, 2006

Related U.S. Application Data

(60) Provisional application No. 60/591,729, filed on Jul. 28, 2004.

(51) Int. Cl.
*G06F 9/44* (2006.01)
*G06F 3/00* (2006.01)
(52) U.S. Cl. .................. 717/120; 717/168; 719/330
(58) Field of Classification Search .................. 717/120
See application file for complete search history.

(56) References Cited

U.S. PATENT DOCUMENTS

| | | | | |
|---|---|---|---|---|
| 5,920,725 A | * | 7/1999 | Ma et al. | 717/171 |
| 5,960,200 A | * | 9/1999 | Eager et al. | 717/147 |
| 6,230,309 B1 | * | 5/2001 | Turner et al. | 717/107 |
| 6,438,744 B2 | * | 8/2002 | Toutonghi et al. | 717/137 |
| 2005/0015293 A1 | * | 1/2005 | Henn et al. | 705/9 |
| 2006/0144010 A1 | * | 7/2006 | Wolf | 52/750 |

OTHER PUBLICATIONS

Gannon et al. (Component Architectures for Distributed Scientific Problem Solving, IEEE Computational Science and Engineering, 1998, vol. 5; No. 2, pp. 50-63).*

* cited by examiner

*Primary Examiner*—Lewis A Bullock, Jr.
*Assistant Examiner*—Hang Pan
(74) *Attorney, Agent, or Firm*—Ostrow Kaufman & Frankl LLP (57) ABSTRACT

Systems and methods for distributing updated property information to interrelated components based on property changes in other components are provided that allow the use of component abstraction. In one embodiment, the present invention may include a property broker system that monitors property changes in components, analyzes the which interrelated components may be affected by the property change, and updates any affected components accordingly.

8 Claims, 6 Drawing Sheets

SYSTEMS AND METHODS FOR DISTRIBUTING UPDATED INFORMATION

CROSS-REFERENCE TO RELATED APPLICATIONS

The present application claims the benefit under 35 U.S.C. §119(e) of U.S. Provisional Application Ser. No. 60/591,729 filed Jul. 28, 2004, the contents of which is hereby incorporated by reference in its entirety.

COPYRIGHT AND LEGAL NOTICES

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright protection to the content disclosed herein.

BACKGROUND OF THE INVENTION

The present invention relates generally to systems and methods for managing and distributing electronic data in a computing system, and more particularly to systems and methods for associating data properties and rules with various domain objects within a program or computing system.

Many applications that operate within a computing environment may be based on or constructed from certain self-contained program components such as portlets or domain objects. While increasing the visibility of business data and operations through such components offers value, an even greater value can be obtained when such domain objects or instances of a component communicate with one another. Among other things, this allows components to communicate data to each other while retaining the abstraction desirable for the component to promote code reuse. To create such an environment, domain objects need be able to pass data to one another, react to changes in their data and respond to events from domain objects. A domain object, which may be referred to hereinafter as a "component" may be a portion of software that may have some data and business logic that serves a specific purpose.

Communication and interaction with other domain objects or component property instances may occur through defined interfaces such as messaging, event handling, or other service operations. Certain computing environments may support a "trigger-workflow" model to facilitate this process. In such an environment, domain objects may pass information to one another using a property broker system, which enables domain objects to publish their data types and properties and to declare actions or services to be performed based on the data values published by other domain objects.

A component that provides a property may be referred to a "source component," and properties published by that domain object source components may be called "OUT properties." The component that receives a property may be called the "target component" and the properties that are received published by the target may be referred to as "IN properties." With cooperative domain objects, a target object can perform an action based on the property or data it receives from other related objects. OUT properties from a source component can be wired to IN properties from a target component. If the OUT property value changes in a source component, this change is propagated to target component's IN property.

Each property published by a component typically includes certain meta-information such as name, namespace, type and direction. The name may specify the property name, whereas the namespace provides uniqueness of the property name in a large system to prevent name collisions. The type may specify the semantics of the property, and direction may specify whether it is an IN property, an OUT property or both.

Components may programmatically be "wired" together through a component wiring tool to implement a persistent connection among data within the objects. A data change in the source component automatically triggers a change on the target components without requiring user intervention. In addition, such an association is typically not hard coded in the component or application system logic so such associations need not be known in development cycle of the components. This allows different application developers to associate properties of one component with properties of other components such that dependant or related information may be changed or updated based on the pre-designated association without requiring additional user actions.

SUMMARY OF THE INVENTION

Systems and methods for distributing updated property information to interrelated components based on property changes in other components are provided. In one embodiment, the present invention may include a property broker system that monitors property changes in components, analyzes the which interrelated components may be affected by the property change, and updates any affected components accordingly. In some embodiments, the property updates may occur substantially simultaneously. The system may also include processing and registry modules analyzing property changes. The system may further include a wiring tool that allows users to associate or "wire" various properties in one component to various other properties in other components. The loose association process allows component properties to remain defined at an abstract level, so specific hard coding of the associations is not required or necessarily visible to an end user.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
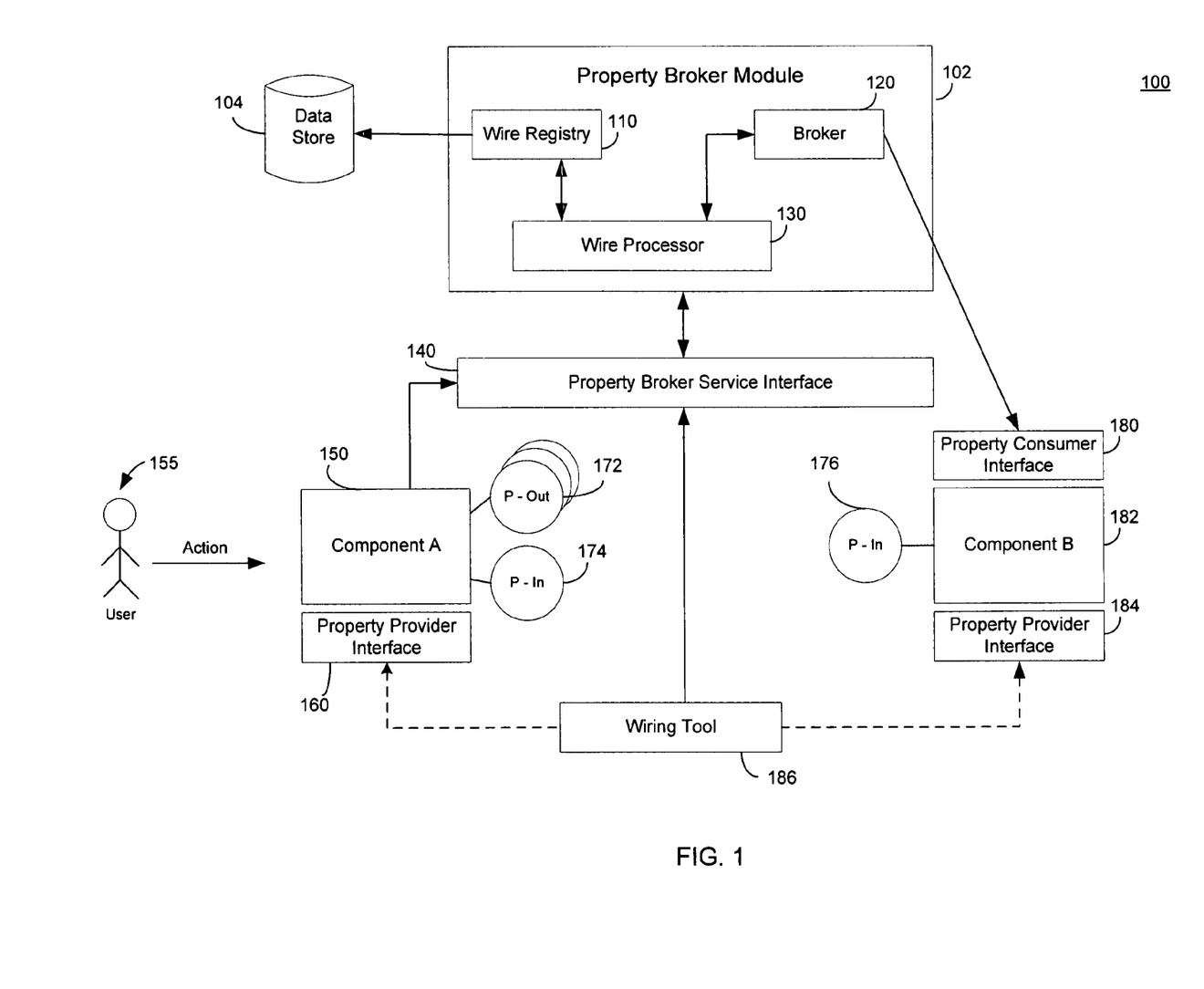
FIG. 1 is a diagram of one embodiment of a property brokering and distribution system constructed in accordance with the principles of one embodiment of the present invention.

FIG. 1 is a logical diagram of a property broker system 100 constructed in accordance with the principles of the present invention for distributing property changes among interrelated components. As shown, system 100 may include property broker module 102 that may include wire registry module 110, broker module 120, and wire processor 130. System 100 may also include a property broker service interface module 140, components 150 and 182, property consumer interface module 180, property provider interface modules 184 and 160, wiring tool 186, OUT property descriptors 172 and IN property descriptors 174 and 176.

As mentioned above, components 150 and 182 may be a portion of software that may have some data and business logic (e.g., logic that determines how data is stored or changed) that serves a specific purpose. For example, a component may be domain object in a system or application such as a Discussion Forum component on a web page. A portion of an electronic document may also be considered to be a component provided it has some service methods that allow its properties to change. For example, and electronic document may be considered a component with the title considered a property with the title being updated as function of the following program statement: setTitle (newTitle). Moreover it will be understood that although only two components 150 and 182 are depicted in the FIG. 1, many additional components may be added and that only two components are illustrated to avoid over complicating FIG. 1.

In operation, a user 155 (or other program or external event) may update a certain portion of component 150. Component 150 may report this change to property broker module 102 through property broker service interface 140 based on certain property descriptors such as OUT property descriptor 172. This may involve communicating certain property descriptions and property values to module 102. Property broker service interface 140 may be implemented as an interface that allows property broker module 102 and wire registry module 110 to communicate with other applications such as wiring tool 186, and components 150 and 182.

Property broker service interface 140 may include means for creating, removing and adding wires and wire binders used to associate components with one another (e.g., in association with wiring tool 186) in addition to means that allows components to communicate property changes to broker module 120. Components may provide property descriptors through property provider interfaces 160 and 184 that allow wiring tool 186 to create associations (wirings) betweens properties of various components. Set forth below is an illustrative example of code that may be used to generate property broker service 140:

```
public interface PropertyBrokerService extends . . . .
{
/**
* Service method for components to communicate property changes to
* Property Broker System.
*/
public void changedProperties(DomainObjectIdentifierVo
domainObjectIdentifier, PropertyVo[ ] propertyValueVos) throws
PropertyBrokerException;
/**
* Below are various service methods for adding and removing
associations.
*/
public WireBinderVo createWireBinder( WireBinderVo binder) throws
PropertyBrokerException;
```

-continued

```
public void removeWireBinder( WireBinderVo binder) throws
PropertyBrokerException;
public WireBinderVo getWireBinder( WireBinderVo binder) throws
PropertyBrokerException;
public WireBinderVo updateWireBinder( WireBinderVo binder) throws
PropertyBrokerException;
public void addWires( DomainObjectIdentifierVo
domainObjectIdentifierVo, WireVo[ ] wire) throws
PropertyBrokerException;
public void removeWires(DomainObjectIdentifierVo
domainObjectIdentifierVo, WireVo[ ] wire) throws
PropertyBrokerException;
}
```

Set forth below is an illustrative example of code that may be used by components to publish their properties. Calls to the interface described below (e.g., property providers 160 and 184) may be made by wiring tool 186 to obtain a set of possible properties that a certain component may publish (as an OUT property) or consume (as an IN property)

```
public interface PropertyProvider extends . . . .
{
        public PropertyDescriptionVo[ ] getPropertyDescriptions(
    DomainObjectIdentifierVo domainObjectIdentifierVo)
                throws PropertyProviderException; }
```

The code set forth below may be used by property broker 120 to call interface 180 when a change occurs in a component property.

```
public interface PropertyConsumer extends . . . .
{
   /**
    * Will be called by Property Broker Service to propagate a
    * wired change to implementing component.
    * <b>IMPORTANT:<b>Change in component values done by this
    * method call should not be reported back to Property Broker
    * Service as it would create an <b>infinite<b> loop.
    */
      public void setProperties[TO1]( DomainObjectIdentifierVo
domainObjectIdentifierVo, PropertyVo[ ] values)
                throws PropertyConsumerException;
}
```

The changes to component 150 may then be processed by-property-broker module 102 and any components of system 100 associated or wired to component 150 may be updated based on the changed information. According to one embodiment of the invention, property broker module 102 may process change information as follows. Broker module 120 may receive the change information from component 150 (in this case the "source component") via service interface 140. Relevant information may then be passed to wire processor 130, which may analyze the change based on wire definitions to determine whether any other components may need to be updated based on the change (i.e. identify "target components" for the identified "source component"). This may involve consulting with registry 110 to determine the appropriate target objects. For example, wire processor 130 may query wire registry 110 by passing a set of property descriptions received from component 150 as "source properties" to be matched with "target properties" in other components. The source property descriptors may include certain meta-information from component 150.

In some embodiments, registry 110 may store wire definitions and other logical associations in a "persistent store" such as storage device 104 which may include any suitable electronic storage device (e.g., such as magnetic or optical disk drive). Moreover, such wire definitions may also be stored in any suitable form such as in an XML file, a relational database, or a proprietary file format.

Once the appropriate target components are identified by wire processor 130 (explained in more detail below), this information may be passed to broker module 120 which may propagate the changed information to the appropriate components (in this case, component 182). Broker 120 may use meta-information in the property descriptions to call component 182 via property consumer interface 180 and communicate the changed information. Broker 120 may communicate these changes synchronously or asynchronously (i.e. putting changes in a queue to be transferred to Component 182 when appropriate). Component 182 may then make the appropriate changes to its properties (which may involve updating IN descriptor 176). In some embodiments, changes made to components are not propagated back to property broker 120 (e.g., in systems where component updates are all performed concurrently).

Property consumer interface 180, as generally illustrated by the code below, may be called by the property broker module 102 when a change occurs in a component property that another component is associated with.

```
public interface PropertyConsumer extends . . . .
{       public void setProperties( DomainObjectIdentifierVo
domainObjectIdentifierVo, PropertyVo[ ] values)
              throws PropertyConsumerException;
}
```

Although the components of FIG. 1 are illustrated within close proximity of one another, it will be understood that some or all of these components may be operating locally or remotely in a distributed or centrally located system. Moreover, it will be further understood that some or all the components may be operating as the same or different processes on a single computer and/or that certain components may be operating in different processes or on different computers, etc. Any local, remote or combination implementation of the components described herein may be used if desired. Moreover, although depicted with interconnections illustrating the flow of information in certain directions, it will be understood that the illustrated interconnections may be bidirectional or unidirectional and may represent data transfer paths that are internal to a computer process or may represent any suitable wireless or hardwired external communication network such a, USB, LAN, WAN, Intranet or Internet.

Moreover, it will be understood the components illustrated in FIG. 1 are represented in the abstract sense and that any suitable particular implementation may be used, if desired. For example, the some or all of the components depicted in FIG. 1 may be implemented as software, firmware or hardware or any combination thereof.

Generally speaking, the present invention allows a user to designate a certain property of one component and associate it with other properties in other components. This association may be done using an external wiring tool, as a part of an application deployment or using any similar association technique known in the art. The wiring tool 186 may include any conventional tool or interface that creates wires (associations) between component properties. Such a conventional wiring tool may include, for example, a program with user interface that allows creation of wires or could be a hard coded XML file that defines the associations, etc.

Such "wires" are typically implemented programmatically and may employ known referencing techniques such as pointers and/or arrays for directing certain data or results from one point in a program to another. Through the use of wires, a user may make associations between various components such that content affected in one area may automatically update related content in another area.

In certain embodiments, the present invention may include the use of "iwires" or "intelligent wires" that may perform certain operations or apply certain rules on the data as it "passes through" the wire. Such operations may include performing conditional logic or performing data transformation operations or additional business logic on the data. For example, conditional logic may include performing certain operations only if a certain condition is met such as typically found in if . . . then type programming statements (e.g., if x>100; then . . . ).

Data transformation operations may include wiring an integer property to a string property and converting the integer data into string data or translating certain complex data structures into other complex data structures. Additional business logic may include certain calculation functions such as converting a monthly salary value into yearly salary value, or other more complex operations. Some of these rules and operations may be recognized by the wire which may automatically perform the appropriate action (e.g., changing integer data to a string data when wired together. etc.) In some embodiments, such rules may also be defined during wire creation by pointing to a certain class implementation.

Figure 2:
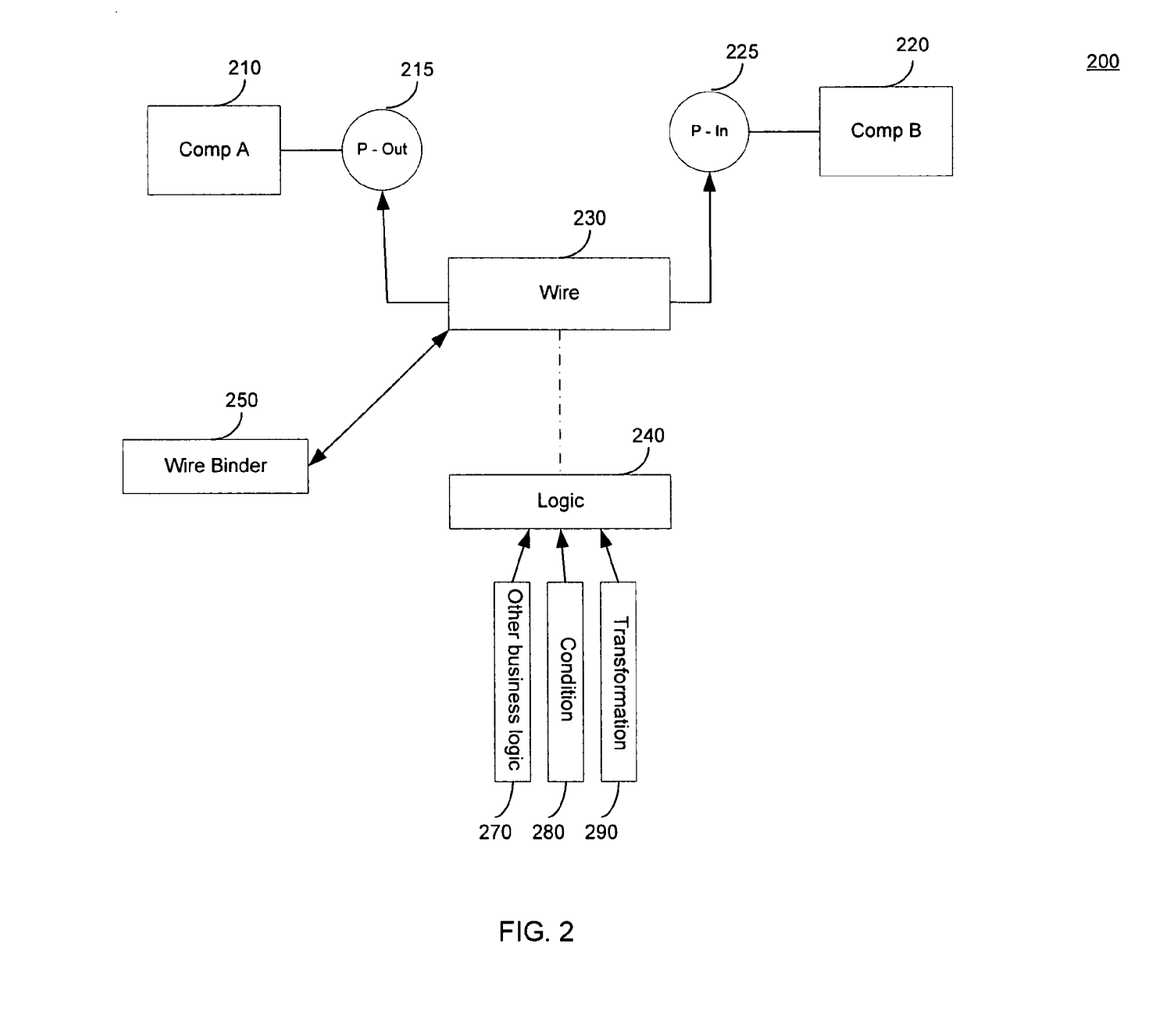
FIG. 2 is a diagram illustrating certain associations between to two components in accordance with the principles of one embodiment of the present invention.

FIG. 2 includes a diagram 200 illustrating how properties may be connected through iwires and wire binders. As shown, component 210 may expose an OUT property represented by property descriptor 215. Property descriptor 215 may include certain meta-information about the property such as the property name, property namespace, property type and property direction (i.e., IN, OUT, etc.). Similarly, component 220 may expose an IN property represented by property descriptor 225. Iwire 230 may connect the properties together (i.e., OUT property 215 to IN property 225). The arrows from iwire 230 typically represent an association between the two properties rather than the direction of information flow. In this example, iwire 230 may have a source and target component defined in it. This meta-information may include information about the components such as a component instance ID (if the iwires are instance based instead of component base) and/or a component URI. The component URI may define a means to communicate with other components and may include a web-service definition, ejb or jndi name, java class name/method or similar information.

Moreover, as shown, iwire 230 may be associated with certain additional logic functions through module 240. These logic functions may be based on, among other things, transformation logic definitions 290, conditional logic definitions 280 and other business logic 270. These definitions may perform the defined logic functions (which may be user defined) as information "travels on" the wire to its destination. Moreover, if a system has multiple wires and or iwires among components that requires a logical separation, wire binders 250 may be employed to logically associate wires 230 which perform the same of similar functions with respect to certain property associations and may also separate wires 230 that perform functions for different components. Multiple wires relating to a particular component association may be associated with a single wire binder.

When a property change occurs, property broker module 102 (FIG. 1) may interact with property broker service module 140, and components 150 and 182 to determine the effect of the property change and communicate that change to dependant components without suffering from system instability (e.g., circular reference problems) even though system 100 does not employ a state machine to keep track of system status. Property broker module 102 may act as an integration point and define how broker 120 may communicate updated property information to other components. For example, property broker module 102 may interpret the information provided by component 150 to obtain the identity of the property data and provide this information to broker 120.

As mentioned above, part of this analysis may include consulting with wire processor 130 and wire registry 110 to determine the "wired" interrelationships of that property with other components. Based on this analysis, broker 120 may then update property component 182 (and any other associated components) to ensure that the dependant components are updated appropriately (e.g., only once), and so there is no "feedback" or "ripple effect" back to the component from which the property change originated). Moreover, this arrangement allows properties to be loosely wired to one another without losing a level of abstraction (e.g., variables may be associated with one another through wires but may remain generalized without the need to hard code names or variable types) thus providing a robust abstract solution that supports complex wiring schemes.

Figure 3:
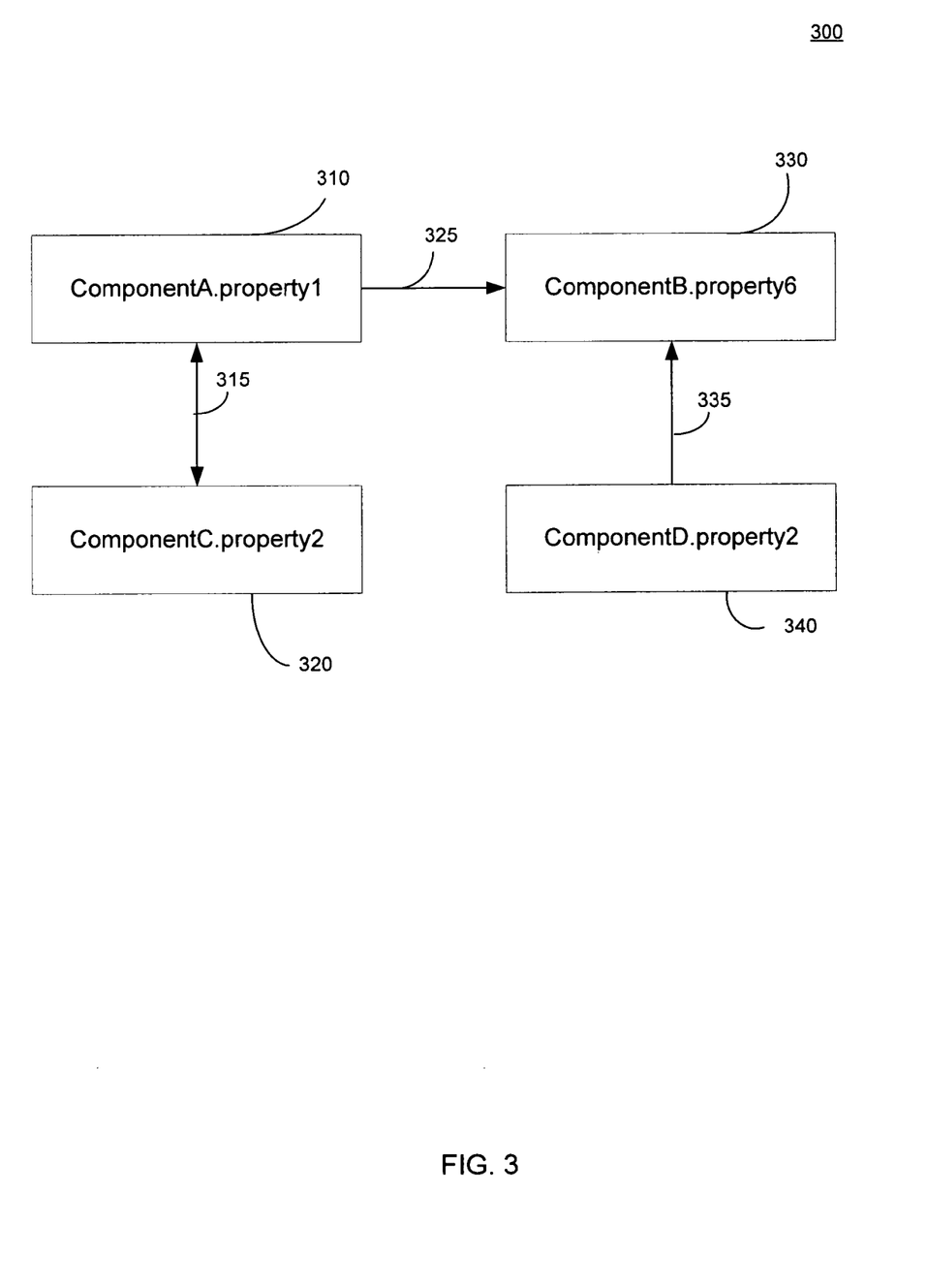
FIG. 3 is a relational diagram illustrating a simple wiring definition in accordance with one embodiment of the present invention.

FIG. 3 is a relational diagram 300 illustrating a simple wiring definition. As shown ComponentA 310 provides definition of property1, wherein property1 is defined as both an IN and OUT property. ComponentB 330 provides definition of property6, wherein property6 is defined as an IN property. ComponentC 320 provides definition of property2, wherein property2 is an IN/OUT property. ComponentD 340 exposes property2 as an output property. ComponentD 340 and ComponentC 320 have same property2 defined, so any name collision can be avoided by use of different namespaces.

Arrows between the components may illustrate how the wires are defined. For example, wire 315 may be defined between ComponentC 320 and ComponentA 310 as a bidirectional wire where property changes from either side would be propagated to each other. In this case, ComponentA 310 and ComponentC 320 are both source and target components. Wire 325 may be defined between ComponentA 210 and ComponentB 330 where ComponentA 310 is the source and ComponentB 330 is the target. Wire 335 may be defined between ComponentB 330 and ComponentD 340 where ComponentB 320 is the target and ComponentD 340 is the source. This is one illustrative example of how XML wiring definitions may appear after being read into system 100 by a wiring tool 186. The arrows in FIG. 3 are pointing from the source property to the target property.

Figure 4:
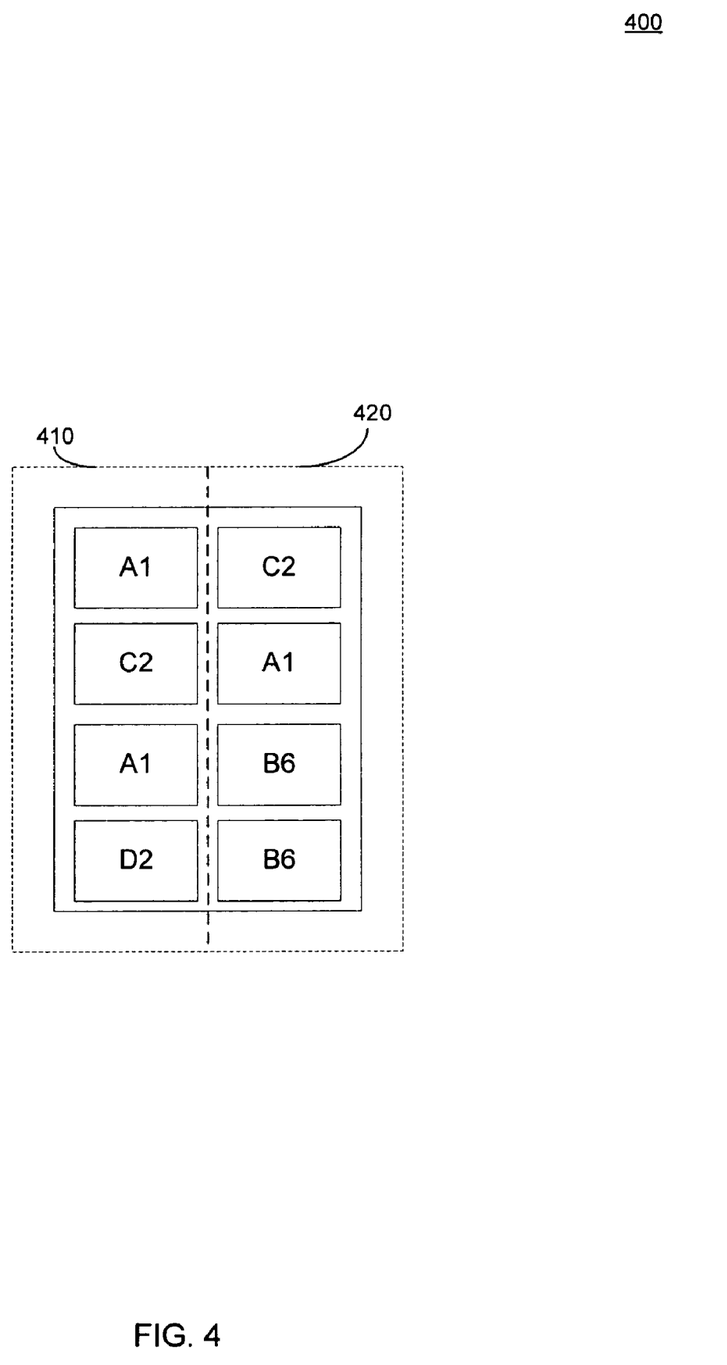
FIG. 4 is an array-based representation of the wiring definition shown in FIG. 3

The interrelationships shown in FIG. 3 may be further processed into the array form shown in FIG. 4. As shown, array 400 may be divided into two columns 410 and 420 wherein column 410 represents the components with source properties and column 420 represents components with target properties. As shown, components in column 410 are associated with the respective components in column 420. This array may be created by wire processor 130 and/or wire registry 110 (FIG. 1) and represents in one way in which the wire definitions illustrated in FIG. 3 may be stored data store 104. Note that in this representation, the bidirectional wire between ComponentA 310 and ComponentC 320 is flattened into two unidirectional wires.

Figure 5:
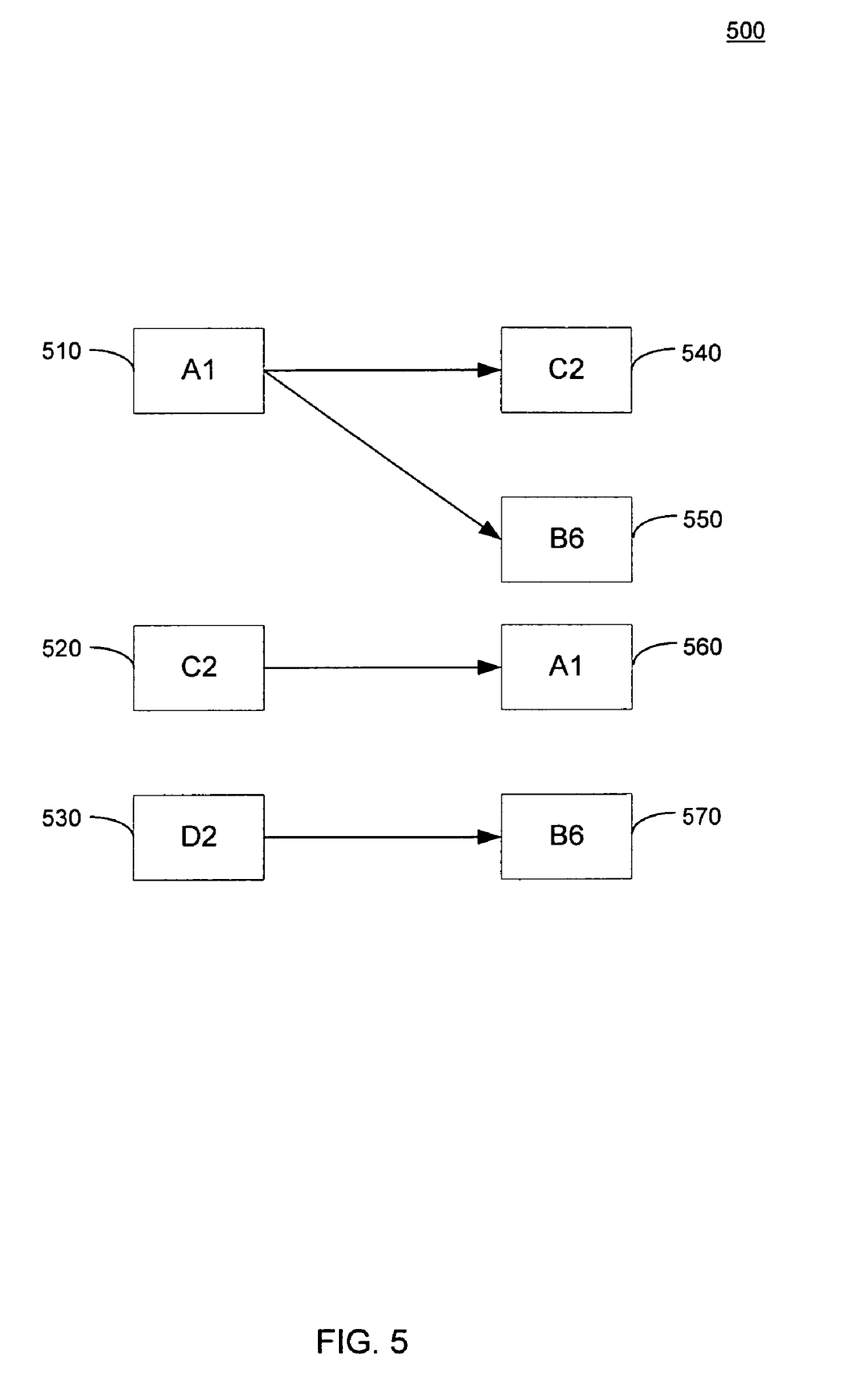
FIG. 5 is a memory graph representation of the wiring definition shown in FIGS. 3 and 4.

The interrelationships shown in FIG. 4 may be further processed into the memory graphs shown in FIG. 5 (e.g., by wire processor 130). As shown, memory graph 500 represents a directional scheme wherein the arrows represent the OUT properties associated with source components A1, C2 and D2 (reference designations 510, 520 and 530 respectively) that update target components 540-570. As shown, memory graph 500 is configured such that the relationships are expressed in a linear fashion such that property updates may occur simultaneously with simple or complex wiring diagrams without the need of a state machine. Updating properties using this arrangement ensures that the properties are updated and the wire interconnections are resolved such that feedback or duplicative updates do not occur. Moreover, this arrangement makes it possible to send multiple property changes to multiple components with one invocation of system 100.

Figure 6:
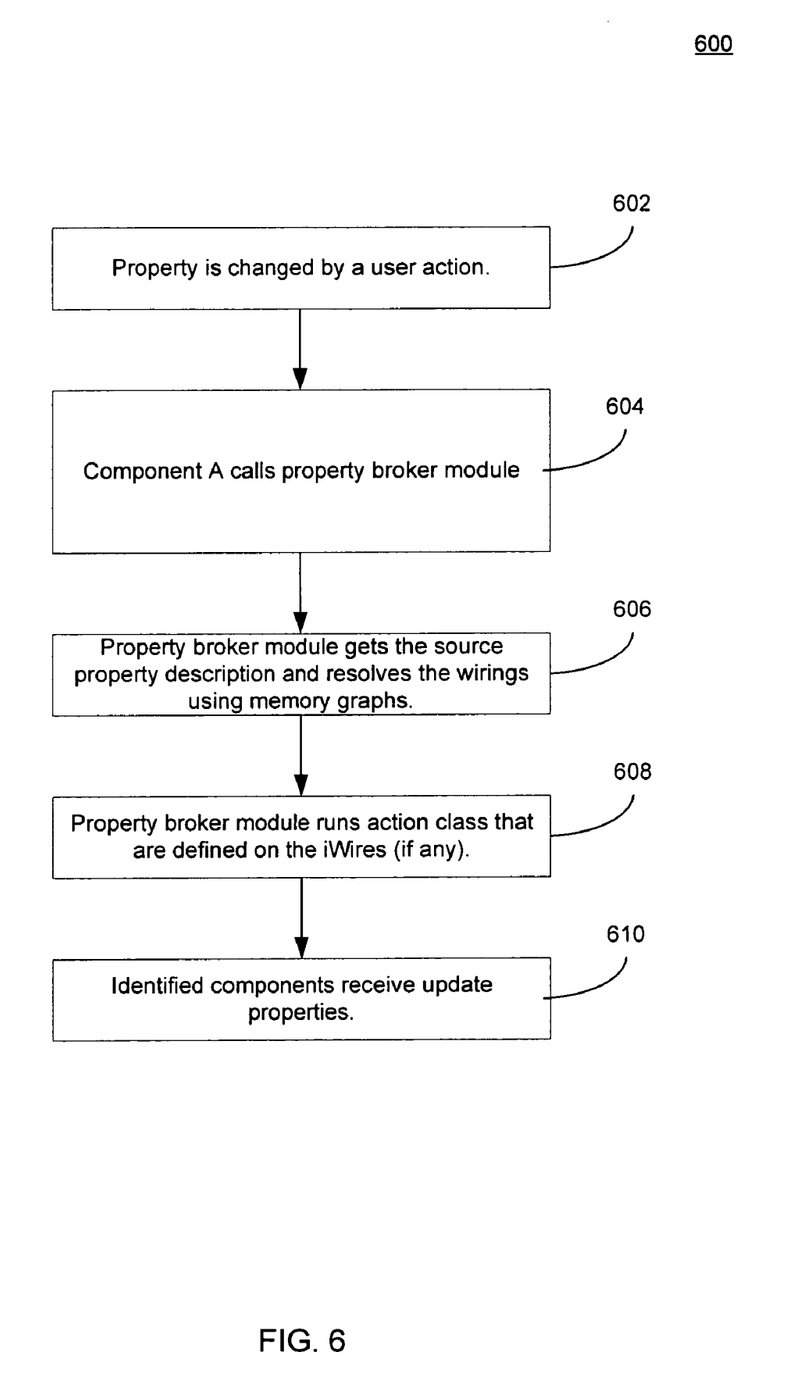
FIG. 6 is a flow chart representing some of the steps involved in the property brokering method in accordance with one embodiment of the present invention.

FIG. 6 is a flow chart 600 illustrating some of the steps performed in accordance with one embodiment of the present invention. The flowchart of FIG. 6 assumes that ComponentA having OUT property A is wired to ComponentB having an IN property B via certain wires. Assume at step 602 that a user and/or a system and/or an external source executes and action on ComponentA that results in change of property A.

At step 604, ComponentA may call a property broker service interface and may pass the DomainObjectIdentifier, (where DomainObjectIdentifier has enough information for property broker system to tell which instance of which component is in use) and property description objects (i.e., property descriptors) for the changed properties where property description objects may define a name, namespace, type and direction of the property. A broker module may receive the property descriptors and provide these to a wire processor. The wire processor may query a registry for wires having matching source property descriptors and return certain wires that match this criteria.

At step 606, the wire processor may further processes the wires into memory graphs similar to those illustrated FIG. 5 which may generate a set of target properties and set of values to be propagated to other components. At step 608, the wire processor may execute any additional logic that may be associated with iwires (if any) and may modify the target property set if needed with results from additional logic operations. At step 610, the broker module may propagate the updated property values to the target components, which may receive property changes through a property consumer interface.

Although several steps in the property brokering process of the present invention have been described above, it will be understood that these steps are merely illustrative, and are not meant to be comprehensive or necessarily performed in the order shown.

Moreover, while the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A computerized system for distributing updated property information to interrelated components based on a property change in at least one component, the system comprising:

a property broker module operating on a first computer, the module monitors property changes and determines which components, if any, are affected by the property change in the at least one component, the property broker module configured to communicate the property change to any interrelated component;

a property consumer interface operating on a second computer coupled to the property broker module, the property consumer interface communicates with the property broker module and at least one interrelated component to convey changed property information to any interrelated component such that any interrelated component updates any associated property based on the property change;

a wire processor and a wire registry in operative communication with the property broker module;

wherein the property broker module communicates property change information to a wire processor and a wire registry to determine target components, if any, associated with a source component; and a wiring tool operative to programmatically interrelate components, the wiring tool creating a plurality of intelligent wires programmatically interrelating the components having the property change information passed therethrough, the intelligent wires performing: conditional logic; data transformation operations; and business logic on the property change information.

2. The system of claim 1 further comprising a property broker service module that communicates property changes from certain components to the property broker module.

3. The system of claim 1 further comprising property provider modules that provide access to property descriptors associated with the components.

4. The system of claim 1 further comprising property descriptors that indicate whether a component has inward or outward bound property dependencies.

5. A computerized method for distributing updated property information to interrelated components based on a property change in at least one component, the method comprising:

monitoring, using a first computer, the property change in the at least one component;

analyzing the change to determine whether any interrelated components are affected by the change;

communicating, using a second computer, updated property information to any interrelated component;

updating the property in any interrelated component based on the communicated property information;

communicating property change information to a wire processor and a wire registry to determine target components, if any, associated with a source component; and programmatically interrelating the components using a wiring tool, the wiring tool creating a plurality of intelligent wires programmatically interrelating the components having the property change information passed therethrough, the intelligent wires performing: conditional logic; data transformation operations; and business logic on the property change information.

6. The method of claim 5 wherein the analyzing further comprises determining whether there are any target components.

7. The method of claim 6 wherein the analyzing further comprises analyzing any target components using memory graphs.

8. The method of claim 7 wherein the analyzing further comprises performing any logic defined between interrelated components.

* * * * *